(12) United States Patent
Williams et al.

(10) Patent No.: US 8,913,231 B2
(45) Date of Patent: Dec. 16, 2014

(54) DETERMINATION OF A SENSOR DEVICE LOCATION IN A SENSOR NETWORK

(75) Inventors: R. Stanley Williams, Portola Valley, CA (US); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 13/643,175

(22) PCT Filed: Apr. 30, 2010

(86) PCT No.: PCT/US2010/033294
§ 371 (c)(1),
(2), (4) Date: Oct. 24, 2012

(87) PCT Pub. No.: WO2011/136816
PCT Pub. Date: Nov. 3, 2011

(65) Prior Publication Data
US 2013/0038856 A1 Feb. 14, 2013

(51) Int. Cl.
*G01C 15/02* (2006.01)
*G01C 15/00* (2006.01)
*G01S 17/87* (2006.01)

(52) U.S. Cl.
CPC .............. *G01C 15/002* (2013.01); *G01S 17/87* (2013.01); *Y04S 20/48* (2013.01)
USPC ......... 356/3.12; 356/3.01; 356/3.1; 356/4.01; 356/4.1

(58) Field of Classification Search
CPC ........ G01C 3/08; G01C 15/002; G01S 17/87; G01S 5/0009; G01S 5/16; G01S 17/48; G01B 11/09; G06F 3/0423
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,100,229 A | * | 3/1992 | Lundberg et al. ............ 356/3.12 |
| 5,926,133 A | | 7/1999 | Green, Jr. |
| 6,522,890 B2 | | 2/2003 | Drane et al. |

(Continued)

FOREIGN PATENT DOCUMENTS

| JP | 08-150582 | 6/1996 |
| JP | 2000-009457 | 1/2000 |
| JP | 2005-084049 | 3/2005 |

OTHER PUBLICATIONS

Kumar, et al., "Localization in Wireless Sensor Network through Constraint Satisfaction", CiiT International Journal of Wireless Communication, Apr. 2009, DOI: WC042009007, Print: ISSN 0974-9756 & Online: ISSN 0974-9640.

(Continued)

*Primary Examiner* — Luke Ratcliffe (57) ABSTRACT

Determination of a sensor device location in a sensor network is described. A system can include rotating optical beams having a known location. Detectors can be located with each of the rotating optical beams. The system can include a sensor device placeable as part of the sensor network. A reflector can be near the sensor device and can reflect at least two optical beams back to the detectors associated with each of the respective optical beams. A triangulation module can triangulate a position of the reflector, and thus the sensor, based on the reflected optical beams.

15 Claims, 3 Drawing Sheets

(56) References Cited

U.S. PATENT DOCUMENTS

| | | |
|---|---|---|
| 7,359,041 B2 | 4/2008 | Xie et al. |
| 2005/0052635 A1* | 3/2005 | Xie et al. .................. 356/3.07 |
| 2005/0174287 A1 | 8/2005 | Wall |
| 2007/0257839 A1 | 11/2007 | Srinivasan et al. |
| 2008/0232297 A1 | 9/2008 | Mizugaki et al. |
| 2009/0128412 A1 | 5/2009 | Ryu et al. |
| 2009/0138353 A1 | 5/2009 | Mendelson |
| 2011/0317154 A1* | 12/2011 | Tan et al. ................ 356/139.03 |

OTHER PUBLICATIONS

Luo, et al., "Multisensor Fusion Based Localization Method for Mobile Sensor Network", Jul. 14-17, 2009, pp. 1480-1485, IEEE/ASME International Conference on Advanced Intelligent Mechatronics, Suntec Convention and Exhibition Center, Singapore.

PCT International Search Report, Feb. 7, 2011, Hewlett-Packard Development Company, L.P. (PCT/US2010/033294, Apr. 30, 2010).

\* cited by examiner

DETERMINATION OF A SENSOR DEVICE LOCATION IN A SENSOR NETWORK

BACKGROUND

A sensor network can include spatially distributed, autonomous sensors useful for monitoring an area. For example, the sensors may be used to monitor physical or environmental conditions, such as temperature, sound, vibration, pressure, motion or pollutants. Sensor networks are used in many industrial, military, and civilian applications. For example, sensor networks can be useful in monitoring or controlling industrial processes, machine health, environment, habitat, healthcare, home automation, traffic control, and so forth.

Sensors in sensor networks can be nodes in the network. In the case of wireless sensor networks, each node may be equipped with a radio transceiver or other wireless communication device, a small microcontroller, and an energy source (such as a battery, for example). Sensors can be created with a variety of sizes, costs, or functionality, and the sensor variations can be a function of the complexity of the purpose for which the sensor network is being implemented. For example, different sensor network uses may involve different resource usages in terms of energy, memory, computational speed, and bandwidth.

Previous systems for placing sensors or identifying a precise location of sensors in a sensor network have a number of drawbacks. Prior art systems can be time-consuming and expensive to implement, or may be harmful to the environment. For example, some systems use heavy machinery to perform surveys, set up a cable grid over the landscape, plant flags identifying locations to place sensor devices, etc. Use of heavy machinery can be damaging to the environment. Furthermore, where the sensor network is established over rugged terrain, the area for the sensor network may be inaccessible by machine. Systems involving hand-planting of flags as part of a survey to identify sensor device locations, or simply having workers approximate the appropriate sensor location can result in sensors not being precisely located. For some sensor applications, greater precision is desired than may be achieved using such a system. Other systems have used Global Positioning System (GPS) devices to precisely determine locations for sensor devices. However, GPS systems can also be expensive and result in large time expenditures while waiting for an update of the precise location of the worker and then determining where that location is with respect to where the sensor is to be placed.

DETAILED DESCRIPTION

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

In describing and claiming the present invention, the following terminology will be used in accordance with the definitions set forth below.

As used herein, the term "field" refers to an area in which one or more components of a sensor network are placed. A field can be indoor or outdoor. The field can be an urban area, a metropolitan area, a wilderness area, an agricultural area, or any other type of area in which a sensor network may be used. The field may even include an underwater area, such as may be used in an undersea sensor network. The field may include the space around a radiating light source within which electromagnetic oscillations of the source can extend and be reflected from another body not in contact with the source.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect on the property of interest thereof.

As used herein, the phrases "optical beam" or "optical beam" can refer to optical rays of light in the infrared, near-infrared, visible, and/or ultraviolet spectrum unless a specific light spectrum is otherwise indicated.

As used herein, the phrase "laser line" refers to a laser beam emitted from a laser source and which is diffused or spread out to form an expanding plane of laser light. In the embodiments described herein, the laser line can be primarily a vertically oriented laser line. The laser line can be formed using optical devices, such as lenses, in connection with the laser source. The laser line can expand from a laser point near the source to form a vertically oriented plane of laser light extending at a height dependent on the distance from the source and the degree of expansion caused by the optical device(s).

Determination of a sensor device location in a sensor network is described. A system can include rotating optical beams having a known location. Detectors can be located with each of the rotating optical beams. The system can include a sensor device placeable as part of the sensor network. A reflector can be in proximity to the sensor device and can reflect at least two optical beams back to the detectors associated with each of the respective optical beams. A triangulation module can then triangulate a position of the reflector, and thus the sensor, based on the reflected optical beams.

Figure 1:
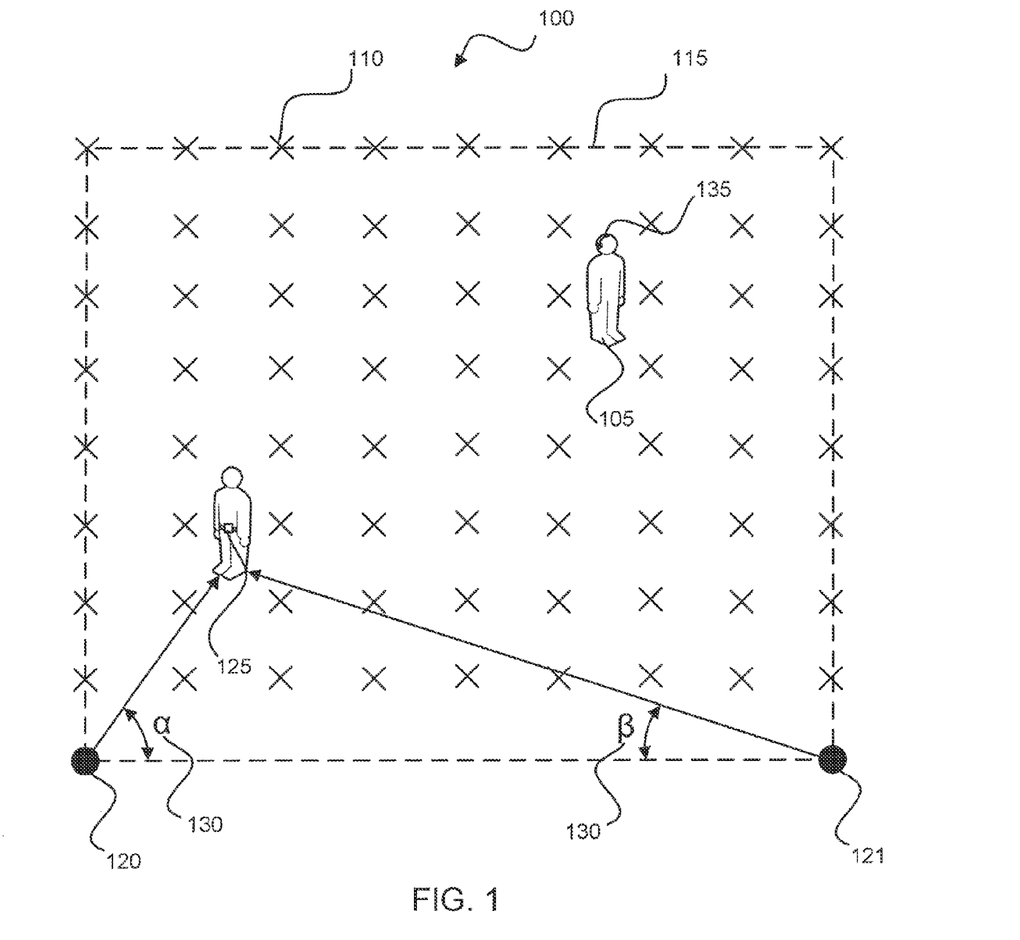
FIG. 1 is a block diagram of a sensor network in accordance with an example.

Referring to FIG. 1, a system 100 is shown which is configured for use in placing sensor devices or identifying the location of a sensor device in a sensor network or the location of a sensor device with respect to a desired sensor device placement location 110. The system includes a plurality of rotating optical beams emitted from a light source having a known location. For example, a relative location of the source of the rotating optical beams with respect to one another can be known. In another example, a longitudinal and latitudinal coordinate of each of the rotating optical beams may be known. In another example, the location of the rotating optical beams can be determined with respect to any other selected location, object, point of interest, etc. The location of the rotating optical beams can later be used in triangulating a sensor device position. Thus, as can be appreciated, various different locations or points of interest may suitably serve as a reference to enable the location of the rotating optical beams to be known and to enable triangulation based on the known location of the rotating optical beams. In one aspect, a point of intersection of multiple optical beams from multiple base stations can form a triangle with one known distance and two known angles 130. This information cart be used for triangulation, as will be further described below.

The rotating optical beams may comprise any suitable form of light. For example, the rotating optical beam may comprise a non-coherent light, such as an incandescent light, a light emitting diode (LED), a fluorescent light, etc. In alternate embodiments, the rotating optical beam may comprise a coherent light, such as may be produced with a laser. The laser light can, in some applications or environmental conditions, have some advantages over at least some of the non-coherent light sources described above. For example, a laser can produce a laser point or a laser beam which can better be used in pin-pointing a precise location using triangulation, as discussed above. In one aspect, the laser beam can be a vertically oriented line or plane projected outwardly from the laser. In contrast, the divergence of some non-coherent light sources can render them less effective in this regard. Additionally, lasers can produce an optical beam which may be better suited for transmission, reflection, detection, etc., even over large distances, such as 100 meters or more.

Various different wavelengths may be suitable for the rotating optical beams. For example, the rotating optical beam may be an infrared, visible, or ultraviolet optical beam. In one example where the optical beam is emitted from a laser, the laser can be configured to emit light with an intensity which is safe for human eyes to protect workers 105 who may be working in the field placing sensor devices, etc. The following discussion may refer to the light source as a laser, or to the optical beam as a laser beam, for convenience and clarity. However, various other light sources or types of optical beams may be used in place of the described laser source or laser beam.

Referring still to FIG. 1, the rotating optical beams can be located with, or located in, or located near a base station 120. For triangulation purposes, the system may include at least two rotating optical beams, and likewise include at least two base stations 120, 121 corresponding to the at least two rotating optical beams. However, the system may include 3 or 4 or more rotating optical beams and base stations, as well. The base stations can be positioned in a field 115 where sensor devices are to be placed or where the location of the sensor devices is to be detected.

Though FIG. 1 shows the base stations placed at corners of the field, the stations can be placed in the field in virtually any desired configuration. For example, the stations can be placed outside of where the sensor network is or is to be placed, or the stations can be inside the sensor network, such as near the center, near the edges, etc. The stations can even be placed quite closely together. As will be discussed below, the rotating optical beam can be reflected and detected at the stations. Thus, the stations can be placed even right next to one another if the system is configured so that the reflected optical beam is only detected at the emitting station. However, in most embodiments, it may be desirable to have at least a minimal gap between the stations to prevent obstruction of the rotating optical beam of one of the stations by the other station. In one aspect, the entire station may rotate to form the rotating optical beam. In another aspect, only a portion of the station is rotated. In another aspect, no part of the station is rotated and only the laser source is rotated. In yet another aspect, no part of the station or the laser source is rotated and the beam is rotated using mirror movement and rotation.

Figure 2:
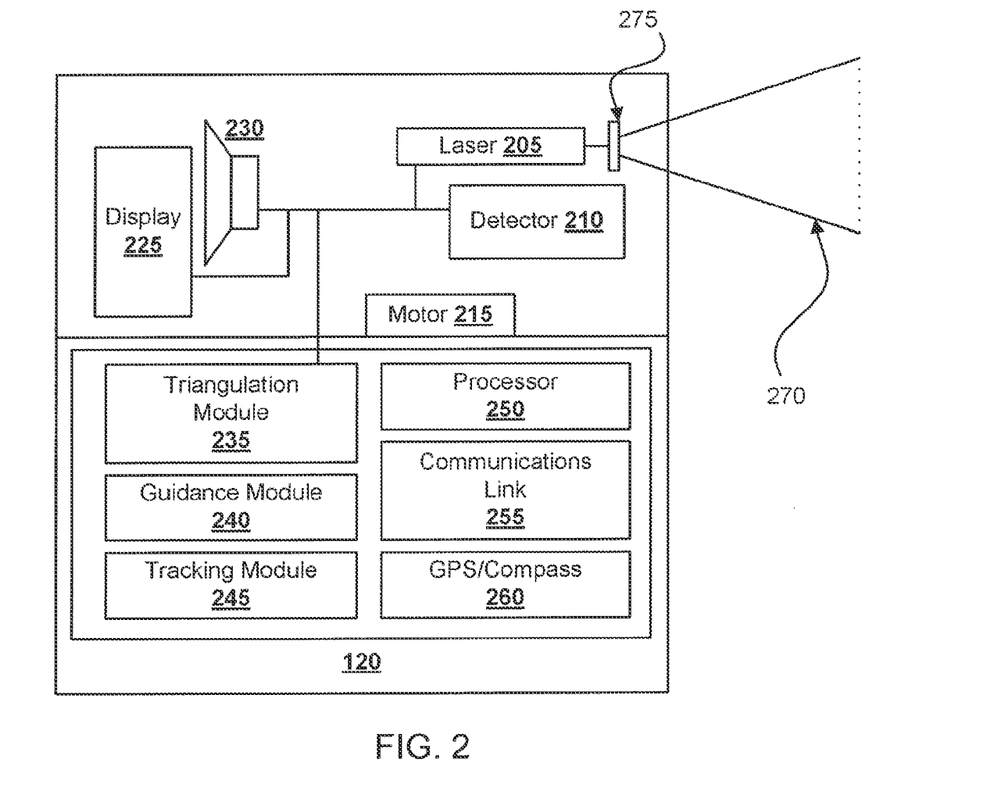
FIG. 2 is a block diagram of a base station used in a system for triangulating sensor locations in a sensor network in accordance with an example.

Referring to FIG. 2, the system can further include multiple detectors 210. The detectors may comprise devices capable of detecting an optical beam. A detector can be configured to detect only a specific type of optical beam. For example, the detector can be configured to detect an optical beam of a specific wavelength or having at least a predetermined intensity. Other detectors may also be used for detecting specific types of optical beams. In this manner, the system can be prevented from detecting spurious optical beams such as rays from the sun, artificial overhead light sources, miscellaneous light reflections or transmissions, etc. The detector can be configured to detect the light emitted from the light source. Thus, for example, if the light source emits an infrared optical beam, a detector may be used which is configured to detect the infrared optical beam.

Because the optical beams 270 are rotating, the detectors 210 can be configured to detect a reflected optical beam at virtually any rotation of the rotating optical beam. Various configurations may be implemented to accomplish the detection at any rotation. For example, a detector may be configured which is "wrapped" around the base station so as to detect a reflection from any direction. In another example, each base station may include multiple detectors strategically positioned on or around the circumference of the base station to capture and detect most or all reflected optical beams. Because the optical beams are rotating, the optical beam may be incident upon the detector of another station during the sweep of the rotation. Also, the detector may inadvertently detect light reflected from a light source on a different station. Thus, in embodiments where the detector is configured to simultaneously detect light from virtually any direction, the detector may be configured to only detect reflected light (which may have a different wavelength than emitted light), or to only detect a wavelength of light specific to the station in which the detector is located. This can ensure that light detected by the detector corresponds to light originally emitted from the target detector.

In another embodiment, the detectors 210 can be configured to rotate with the rotating optical beams 270. In this embodiment, the detectors and rotating optical beams may rotate in a substantially synchronized manner such that a respective speed of the detector and rotating optical beam is substantially the same and such that the detector is always in a position to detect a reflected optical beam. In one aspect, the base station may include an upper portion and a lower portion. The upper portion can include the light source and the detector and be rotatable. The upper portion may be connected to the lower portion via a rotatable drive shaft operably rotated by a motor located in the lower portion. Alternately, the motor 215 may be located in the upper portion. Various other configurations by which the light source and the detector are rotated may be readily recognized and are considered to be within the scope of this disclosure. Rotation of the detector with the optical beam can ensure that the detector will only detect light reflected from the optical beam with which the detector is associated. Additionally, the rotations of the different stations can be offset so that the light from one station will not be incident on the detector of another station to prevent mis-identification of the other station as a sensor. In other embodiments, the stations may implement the features described above with detection of only specific wavelengths, etc. so that in embodiments where the stations are not offset or do not rotate at exactly the same speed, an unintended detection is not made.

In one aspect, regardless of the detector configuration, the system 100 may be configured to recognize the position another of the base stations and to disregard light from the other base station. In another aspect, which will be described in further detail below, the system may track a location of a worker in the field and may be configured to disregard signals or reflections which are inconsistent with the previously detected position of the worker.

The system may include one or more sensor devices which are located in the sensor network or which are to be placed as part of the sensor network. A sensor device can be a sensor network node and may be arranged as part of an array of sensor devices. The sensor network can be a wired or a wireless sensor network. For convenience and simplicity, in many applications a wireless sensor network may be desirable over a wired network. The sensor devices can be configured to monitor conditions in the field. The monitored conditions can vary greatly depending upon the application and may include conditions such as those described above regarding potential uses of sensor networks. The sensor device can be configured to communicate with another sensor device and/or with one or more base stations or other devices. In wireless sensor networks, the sensor devices may be battery-operated, solar-powered, etc. The sensor devices may be constructed to be able to withstand even harsh environmental conditions, including very low or very high temperatures or fluctuations in temperature, or various degrees of precipitation of various forms. The sensor devices can be constructed to withstand a minimal degree of applied force, such as a rock dropping onto the sensor device or a foot fall.

Installed sensor devices may form the sensor network. The sensor network can be configured to cope with node failures. In one aspect, the sensor network may comprise a wireless mesh network. The sensor network may be configured to adapt to mobility of nodes (e.g., sensor devices), or to dynamically maintain a network topology. For example, the sensor network can resolve or work around communication failures, etc. The sensor nodes can be small computing devices, which have interfaces and computing components. The sensor nodes may include a processing unit with limited computational power and limited memory, sensors (including specific conditioning circuitry), a communication device (usually radio transceivers or alternatively optical), and a power source. In some aspects, the base stations can be distinguished from the sensor nodes as having much more computational, energy and communication resources. One or more base stations can act as a gateway between sensor nodes and a user or administrator.

The system can include one or more reflectors. The reflector can be positioned near to the sensor device. For example, the reflector may be physically attached to the sensor device, removably or otherwise, or may be on a worker or an article of clothing worn by the worker or on a device carried by the worker. (For example, FIG. 1 shows a reflector 125 attached to a belt of a worker). The reflector may be any suitable type of reflector capable of reflecting the rotating optical beams back towards the detectors. For example, the reflector may comprise an article of clothing or a device with a retro-reflector. The retro-reflector can be configured to reflect light back to the light source with a minimum scattering of light. In other words, an electromagnetic wave front is reflected back along a vector that is parallel to but opposite in direction from the wave's source, even when an angle of incidence is greater than zero. This is unlike a planar mirror, which reflects light back to the source only if the mirror is exactly perpendicular to the wave front, having a zero angle of incidence. Some types of retro-reflectors which may be used include corner cube reflectors, embedded glass bead reflectors (also known as "cat's eye" reflectors), phase conjugation reflectors, etc. The reflector can be configured to reflect optical beams from multiple base stations back toward detectors at the respective stations. Thus, light from multiple stations may be incident on and reflected by the reflector and be detected by a detector associated with the source of the light. The system can then use the detected light to triangulate a position of the reflector.

The system can include a triangulation module 235. The triangulation module can be in communication with the plurality of rotating optical beams 270 and the plurality of detectors 210. In some aspects the communication may be nothing more than transmission of the position of the rotating optical beam and/or detector at the time of the detection. Also, for example, the system may be configured to monitor a rotation position of the rotating optical beam, detector and/or the mirrors guiding the optical beams to and from the optical beam source and detector. Though the rotating optical beam or the detector may not actually transmit rotation information to the triangulation module, the triangulation module may be said to be in communication with the rotating optical beam and/or the detector because of the monitoring of the rotation of the beam and/or detector.

The triangulation module 235 can be configured to triangulate a position of the reflector based on the reflected optical beams. For example, the location of the base stations may be known with respect to one another. An imaginary line may exist between two base stations. When a base station detects a reflected optical beam, the rotational position of the optical beam can be identified and the angle between the imaginary line and the vector pointing in the direction of the rotational position at the time of detection can be identified. In this example, because the location of the base stations with respect to one another is known, a distance between the base stations (e.g., the distance of the imaginary line) can be known. The triangulation module can use the distance between the base stations and the angles determined by the multiple base stations to identify a point of intersection between vectors from each of the stations. The point of intersection and the two base stations can then form a triangle with one known distance and two known angles. From this information, a precise location of the point of intersection can be calculated using triangulation techniques and formulas.

In accordance with some embodiments, the base stations can be equipped with a GPS system 260. The GPS system can be used to determine a precise position of the base station. In one aspect, the base stations can communicate with one another to determine the location of the other station. The base stations may include a compass 260. The station can use the compass to determine the location of magnetic North. The vector angles at the time of detection can be determined with respect to magnetic North. Additional angles and or vectors may be calculated from this determination to better facilitate triangulation.

In accordance with embodiments, the system may determine a location of the reflector using only a single rotating light source 205 and detector 210. For example, the system may be configured to emit light from the light source in pulses and measure the time difference between when a pulse was emitted and when the reflected pulse was detected. Using the measured time difference and a known speed of the light, the distance to the reflector can be determined. Using the distance and knowledge of the angle of rotation, the location of the reflector can be determined. Where the system includes multiple base stations operating on this principle, each of the base stations can independently determine the location of the reflector and the triangulation module can resolve any discrepancies which may exist between the two solutions. In other embodiments, the triangulation module can operate to triangulate the position as described above and use the measured time difference to confirm the accuracy of the triangulation.

The triangulation module 235 can be used to determine a location of a sensor device which has been placed in the sensor network. In another aspect, the triangulation module can be used to determine a location of a worker in the field. The system may also determine a location of the worker in the field with respect to a location of a placed sensor device. In another aspect, the system can determine a location of the sensor or the worker with respect to a desired location for placing the sensor device.

The system can include a guidance module 240. The guidance module can be configured to provide guidance to a worker in the field. For example, the guidance module can be used to guide a worker to place the sensor in a predetermined position. Where the system has determined a location of the sensor or the worker (using the reflector) with respect to a desired location for placing the sensor device, the system can provide guidance signals to guide the worker from the current location to the desired location. For example, the guidance signals may comprise audio or visual signals. Other sensory signals may also be used. For example tactile signals may be transmitted to a handheld device used by the worker.

Visual signals can be displayed or transmitted to the worker in a number of ways. For example, the base station can transmit a wireless guidance signal to an electronic device carried by the worker. The electronic device can then display the guidance signal to the worker in the form of arrows, text, symbols, etc. which may be useful in guiding the worker to the desired location. In another aspect, the base station may include a visual display 225 or one or more visual indicators which may be visible by the worker in the field and provide guidance to the worker.

In other embodiments, the guidance module 240 can be configured to transmit audio guidance signals to guide a worker to a desired sensor device location based on the comparison of the triangulated position and the desired sensor device location. The audio signals can be broadcast as guidance instructions by one or more speakers 230 at the base station or some other location in the field in communication with the base station so that a worker in the field can hear the guidance instructions. In another aspect, the audio signals can be transmitted to a listening device 135 (FIG. 1) carried by the worker. The listening device can include a speaker by which the worker can hear the instructions. For example, the speaker may be part of headphones worn by the worker. In another example, the speaker may be part of a radio, walkie-talkie, Personal Digital Assistant (PDA), smart-phone, or the like.

Transmitted audio signals may comprise voice directions instructing the worker to move in a particular direction. The instructions may instruct the worker to move a specified distance in the particular direction. In another aspect, the voice directions may be provided through a text to speech module on the electronic device carried by the worker when the guidance signal is transmitted is text, in another aspect, the transmitted signals can be sent as coded signals, which may include one or more audible tones or a radio signal. For example, the audio signals may include a tone or click frequency. The audio signals may include varying frequencies of tones or series of tones which can be used to indicate an approximate distance from the desired sensor device location. The audio signal can include two different signals, such as a lateral guidance signal and an axial (e.g., height) guidance signal. The forgoing examples are illustrative of the triangulation system described herein. Other modifications in form, usage and details of implementation can also be made without departing from the basic principles and concepts of the system. Additional embodiments and variations in the system will be described below.

In accordance with embodiments, a laser source can be configured to produce a laser line. Laser lines and the formation thereof are known. In one example, the laser may comprise additional optics 275 to form the laser output beam into a laser line. Use of a vertically-oriented laser line instead of a laser point or other configuration can enable detection of a light reflected from a reflector at a variety of heights since the laser light spreads out to form a vertically plane of laser light. For example, the sensor network may be placed over uneven terrain. Use of laser lines can enable reflecting and detecting the projected optical beam at a variety of different heights. In applications involving an uneven terrain, the base stations can be placed at one or more of the highest locations in the field. This can allow the laser line to reach a reflector at most or all locations within the field without obstruction by the landscape.

In accordance with embodiments, one or more of the base stations can include a processing station. The processing station can include a processor 250. The processing station can be associated with the rotating optical beam associated with the station. The processing station can also be in communication with the triangulation module. The triangulation module can use the processor in processing the triangulation of the reflector.

The base station can also include a communications link 255 for communicating with one or more other base stations. The communications link can facilitate electronic communication between processing stations. The communications link can be used to transmit information, such as laser beam rotation position from one base station to another. In one aspect, each base station may compute the triangulated position. In another aspect, one base station may triangulate the position and communicate the result to the other station. In another aspect, a single base station may receive the information from another base station, triangulate the reflector position and transmit guidance signals to a worker. In yet another aspect, different base stations may be used to provide guidance to different workers. The communications link between the base stations may be any suitable type of communications link. For example, the base stations may communicate via a cable, wireless transmission, laser link, etc.

Figure 3:
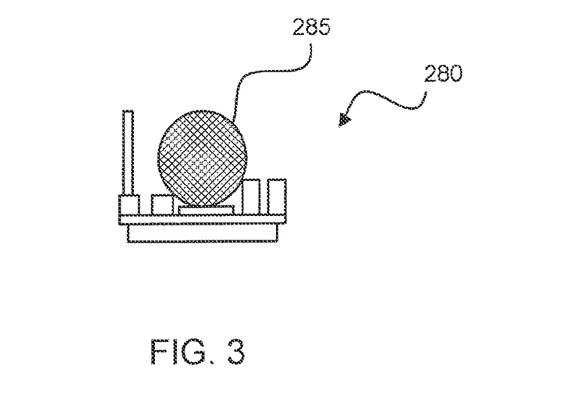
FIG. 3 is a side view of a sensor device with an attached reflector, in accordance with an example.

Referring to FIG. 3, an example side view of a sensor device 280 with an attached reflector 285 is shown. As described above, the reflector can be permanently or removably attached to the sensor device. In other examples, the sensor device does not include a reflector and a reflector can be carried or worn by a worker.

Figure 4:
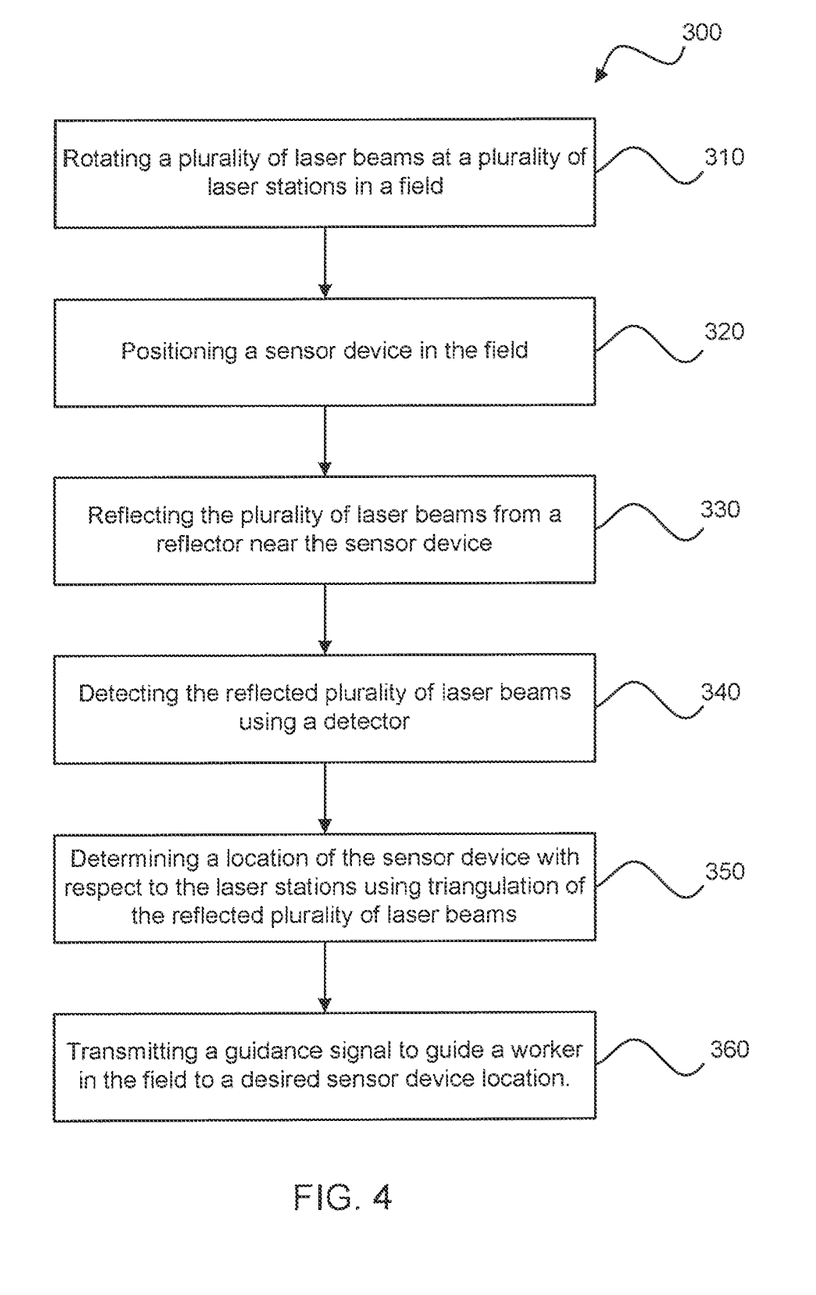
FIG. 4 is a flow diagram of a method for placing sensor devices in a sensor network in accordance with an example.

Referring to FIG. 4, a flow diagram of a method 300 is shown for placing sensor devices in a sensor network. The method can include rotating 310 a plurality of laser beams at a plurality of laser stations in a field. A sensor device can be positioned 320 in the field. The sensor device can be stationary or in motion. The plurality of laser beams can be reflected 330 from a reflector in proximity or near the sensor device. The reflected plurality of laser beams can then be detected 340 using a detector associated with the plurality of laser beams. A location of the sensor device can be determined 350 with respect to the laser stations using triangulation of the reflected plurality of laser beams. A guidance signal can be transmitted 360 to guide a worker in the field to a desired sensor device location.

In one example, the method can include transmitting varying frequencies of tones or series of tones to indicate an approximate distance from the desired sensor device location. In another example, the method can include displaying visual guidance cues to the worker based on the transmitted guidance signal. The method can include rotating the detector in synchronization with the plurality of laser beams. In another example, the method can include rotating the plurality of laser beams by rotating at least one mirror near a non-rotating laser device associated with each of the plurality of laser beams.

In accordance with additional embodiments, the method can include tracking a plurality of reflectors substantially simultaneously. For example, multiple workers may be in the field, each worker placing sensors in the sensor network. The system can include a tracking module 245 (see FIG. 2) configured to track the location of each of the workers to distinguish between the workers. For example, the tracking module can compare a position of a reflector at a first time with a position of the reflector at a second time. The tracking module can determine the likelihood that the reflector detected at the first and second times are the same. For example, if the system can compare the distance between the positions of the reflectors at the first and second time. If the distance between the two positions is greater than what may be expected or greater than what may be possible for a worker on foot to cover in the time between the first and second time, then the tracking module may determine that the two detections belong to two different reflectors. Likewise, the system can be configured to account for other means of transportation, such as ATV, truck, etc. which may cover greater distances in shorter amounts of time. In some embodiments, the tracking module can be configured to monitor a direction of movement of the reflector. If the detector detects a reflection which is inconsistent with the direction of movement of the reflector, the system can monitor and determine whether that detection is a redirection of the direction of movement of the first reflector or whether the detection is a second reflector.

The method and system can be configured to distinguish among sensors or workers by distinguishing a reflected wavelength. For example, reflectors on different sensor devices or worn by different workers may be formed using materials that can scatter light inelastically (e.g. Raman scattering). The laser light scatter by these devices will suffer a slight change in the wavelength and each device will be identified by the wavelength shift it imparts. The different inelastic wavelength shifts that the reflectors impart result in a wavelength of light reflected from one reflector being different than a wavelength of light reflected from a different reflector. Thus, if a first wavelength of reflected light is detected, the system can determine that the reflector belongs to a first worker, and if a second wavelength of reflected light is detected, the system can determine that the reflector belongs to a second worker.

The tracking module can thus be configured to identify and track multiple reflectors associated with multiple workers and/or sensors substantially simultaneously using a continuity of reflector position and/or the difference in wavelength of reflected laser beams from different reflectors. The guidance module can then transmit a plurality of different guidance signals to guide a plurality of workers to different desired sensor device locations. The guidance signals can be transmitted at particular frequencies, or to specific devices so as to provide guidance signals relevant only to a particular worker to that worker. In other embodiments, the guidance signals can be transmitted with worker identifiers to multiple workers and the workers can distinguish among the signals using the identifiers.

The systems and methods herein can be used for very accurate measurement of the locations of the sensor nodes during or after placement. For example, using collimated laser beams of approximately 1 cm diameter can lead to accuracy of better than 10 cm in a 100×100 m field. In some embodiments, the laser beams can provide accuracy of up to $1/10^{th}$ cm in a 100×100 m field. This technology can provide a faster and less expensive means for setting up a sensor network have been used in previous systems. Greater precision can be achieved than through previous methods and workers need not perform a survey, plant flags, use cables, etc. for determining sensor node locations. In fact, the sensor node locations according to the present location, though shown as a grid in FIG. 1 can be laid out in any desired pattern and need not form a regular or grid pattern. Due to the use of light and reflection, the described systems and methods may operate more effectively where the atmosphere is clear and a direct line of sight from the base station to a desired sensor device location is available.

The sensor networks described herein can be used in many applications including, but not limited to: area monitoring, environmental monitoring, industrial monitoring, water or wastewater monitoring, landfill ground well level monitoring, flare stack monitoring, water tower level monitoring, vehicle detection, apiculture, windrow composting, greenhouse monitoring, exploration for oil or water, etc.

The various engines, tools, or modules discussed herein may be, for example, software, firmware, commands, data files, programs, code, instructions, or the like, and may also include suitable mechanisms.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions. Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for determining a sensor device location in a sensor network, comprising:
   a plurality of rotating optical beams having a known location;
   a plurality of detectors, the detectors co-located with respective ones of the rotating optical beams;
   a sensor device configured to be placed as part of a sensor network;
   a reflector near to the sensor device and configured to reflect a plurality of light beams from respective ones of the rotating optical beams back to the corresponding detector co-located with the corresponding rotating optical beam;
   a triangulation module in communication with the plurality of rotating light beams and the plurality of detectors, the triangulation module to triangulate a position of the reflector and sensor device based on the reflected light beams; and
   a guidance module configured to provide locational guidance to a worker to place the sensor in a desired position.

2. A system in accordance with claim 1, wherein the sensor device comprises a plurality of sensor devices, the reflector comprises a plurality of reflectors positioned near respective ones of the sensor devices, and the triangulation module comprises a tracking module to identify and track the reflectors substantially simultaneously using at least one of:
   a continuity of reflector position; or
   a difference in wavelength of reflected laser beams from different ones of the reflectors, the different ones of the reflectors each exhibiting a different inelastic scattering wavelength shift.

3. A system in accordance with claim 1, wherein the plurality of rotating optical beams comprise a plurality of rotating laser beams rotated by rotating a laser device from which the beam is emitted.

4. A system in accordance with claim 1, wherein the plurality of detectors are rotated in synchronization with the plurality of rotating optical beams.

5. A system in accordance with claim 1, wherein the reflector is on the sensor device.

6. A system in accordance with claim 1, wherein the reflector is on a worker near the sensor device.

7. A system in accordance with claim 1, wherein the plurality of rotating optical beams comprise a plurality of vertically oriented, rotating laser lines.

8. A system in accordance with claim 1, further comprising a tracking module configured to track and triangulate the position of multiple sensor devices substantially simultaneously.

9. A system in accordance with claim 1, further comprising:
   a plurality of processing stations associated with respective ones of the plurality of rotating optical beams, at least some of the plurality of processing stations being in communication with the triangulation module; and
   a communications link between the plurality of processing stations to facilitate electronic communication between the plurality of processing stations.

10. A system in accordance with claim 1, further comprising a magnetic compass, the triangulation module configured to triangulate the position of the reflector based on an angle of the reflected light beams with respect to magnetic North.

11. A system for determining a sensor device location in a sensor network, comprising:
    a plurality of rotating optical beams having a known location;
    a plurality of detectors co-located with respective ones of the plurality of rotating optical beams;
    a sensor device;
    a reflector near the sensor device to reflect a plurality of light beams from the plurality of rotating optical beams back to respective ones of the detectors, wherein the reflector comprises a plurality of reflectors each having a different inelastic scattering wavelength shift; and
    a triangulation module in communication with the plurality of rotating light beams and the plurality of detectors, the triangulation module configured to triangulate a position of the reflector and sensor device based on the reflected light beams, the triangulation module further comprising a tracking module configured to identify and track the reflectors substantially simultaneously using at least one of:
    a continuity of reflector position; and
    a difference in wavelength of reflected laser beams from different reflectors when the reflectors each comprise a different inelastic scattering wavelength shift.

12. A method for placing sensor devices at accurate locations in a sensor network, comprising:
    rotating a plurality of laser beams at a plurality of laser stations in a field;
    positioning a sensor device in the field;
    reflecting the plurality of laser beams from a reflector near the sensor device;
    detecting the reflected plurality of laser beams using a detector in proximity to the laser stations;
    determining a location of the sensor device with respect to the laser stations using triangulation of the reflected plurality of laser beams; and
    transmitting a guidance signal to guide a worker in the field to a desired sensor device location.

13. A method in accordance with claim 12, wherein transmitting the guidance signal further comprises transmitting different frequencies of tones or series of tones to indicate an approximate distance from the desired sensor device location.

14. A method in accordance with claim 12, further comprising displaying visual guidance cues to the worker based on the transmitted guidance signal.

15. A method for placing sensor devices at accurate locations in a sensor network, comprising:
    rotating a plurality of laser beams at a plurality of laser stations in a field;
    positioning a sensor device in the field;
    reflecting the plurality of laser beams from a reflector near the sensor device;
    detecting the reflected plurality of laser beams using a detector in proximity to the laser stations;

determining a location of the sensor device with respect to the laser stations using triangulation of the reflected plurality of laser beams;
transmitting a guidance signal to guide a worker in the field to a desired sensor device location; and
tracking a plurality of reflectors substantially simultaneously; and wherein transmitting the guidance signal to guide the worker further comprises transmitting a plurality of different guidance signals to guide a plurality of workers to different desired sensor device locations.

* * * * *